UNITED STATES PATENT OFFICE.

CHARLES DE LA HARPE, OF BASLE, SWITZERLAND, ASSIGNOR TO DYE WORKS, FORMERLY L. DURAND, HUGUENIN & CO., OF SAME PLACE.

LEUCOGALLOCYANIN-SULFONIC ACID AND PROCESS OF MAKING SAME.

SPECIFICATION forming part of Letters Patent No. 663,221, dated December 4, 1900.

Application filed July 19, 1900. Serial No. 24,122. (Specimens.)

*To all whom it may concern:*

Be it known that I, CHARLES DE LA HARPE, chemist, a citizen of the Swiss Republic, and a resident of Basle, Switzerland, have invented certain Improvements in the Manufacture of Gallocyanin Dyes, of which the following is a clear and complete specification.

This invention relates to the manufacture of leucogallocyaninsulfonic acids, which are valuable coloring-matters.

As is known, the gallocyanins obtained by condensing nitrosodimethylanilin or nitrosodiethylanilin with gallic acid, ethereal gallates, or gallamic acid, as ordinary gallocyanin, prune, gallamin-blue, and coréin 2 R cannot be sulfonated, either by heating or in the cold, by the usual means, such as sulfuric acid, sulfuric anhydride, and the like. The sole process known hitherto for manufacturing sulfonated gallocyanins is that described in specification of Letters Patent No. 534,809, dated February 26, 1895, which has technical disadvantages. I have now found that the leuco derivatives of these gallocyanins obtained according to the method described in specification of Letters Patent No. 629,666, dated July 25, 1899, may be sulfonated directly by the usual processes if the operation is conducted at a low temperature. Concentrated sulfuric acid and fuming sulfuric acid may be used for the purpose; but the reaction is much smoother when chlorosulfuric acid $(SO_2.OH.Cl)$ is used. The leucogallocyanin sulfonic acids obtained by this process are coloring-matters. Those derived from gallamic acid have the valuable property of yielding on chromium mordants tints much bluer than those furnished by the primitive gallocyanins. The leucogallocyanin sulfonic acids die chromium mordanted cotton which has been printed with a discharge without soiling the whites.

The following examples illustrate the invention, which is not, however, limited thereto:

*Example I—Manufacture of the leucosulfonic acid derived from coréin 2 R,* (prepared by treating gallamic acid with nitrosodiethylanilin-hydrochlorid or with diethylamidoazobenzene hydrochlorid.)—Ten kilos of leucocoréin 2 R, prepared according to specification of Letters Patent No. 629,666, are introduced little by little and with thorough stirring at the ordinary temperature, which must not be allowed to rise, into sixty kilos of sulfuric acid of one hundred-per-cent. strength. The mixture is set aside until a sample of it gives a copious precipitate when mixed with water. This happens after the lapse of about from four to six days. The mass is then poured into one thousand liters of ice-water. The precipitate is filtered off after some hours and pressed. It is then in a condition fit for use.

*Example II—Manufacture of the leucosulfonic acid derived from gallamin blue,* (prepared by treating gallamic acid with nitrosodimethylanilin hydrochlorid.)—Ten kilos of leucogallamin blue prepared according to specification of Letters Patent No. 629,666 are dissolved, with the same precautions as those mentioned in Example I, in twenty kilos of sulfuric acid of one-hundred-per-cent. strength, and in the solution are poured, little by little and with thorough stirring, twenty kilos of chlorosulfuric acid, $(SO_2.OH.Cl.)$ The end of the reaction is recognized as in Example I and occurs in about from two to three days. The mass is then poured into one thousand liters of ice-water, and the manufacture is finished as in the preceding example.

*Example III—Manufacture of the leucosulfonic acid derived from prune,* (prepared by treating methyl gallate with nitrosodimethylanilin hydrochlorid.)—Ten kilos of leucoprune prepared according to specification of Letters Patent No. 629,666 are introduced little by little with thorough agitation and at the ordinary temperature, which must not be allowed to rise, into forty kilos of chlorosulfuric acid. After one or two days there are introduced little by little into the mixture, which is kept well cooled, two kilos of sulfuric acid of fifty-per-cent. strength. The whole is then poured into eight hundred liters of ice-water, and twenty-two kilos of caustic soda and one hundred kilos of common salt are added. The manufacture is finished as in Example I.

All these leucogallocyaninsulfonic acids are in dry state a violetish-gray to dark-olive-green powder, scarcely soluble in water, chiefly in presence of mineral acids. Their solutions in alkalies become at once violet-red to violet-blue in air and become gray-blue to bright blue on addition of acetic acid. On addition of hydrochloric acid to these solutions in alkalies the coloration of the solutions become violet and a precipitate is formed. Their solutions in concentrated sulfuric acid are pale violet and dichroic and become intense blue on addition of an oxidant.

What I claim is—

1. The herein-described process for the manufacture of leucogallocyaninsulfonic acids by treating with suitable sulfonating agents at low temperatures the leucogallocyanins, hereinbefore specified.

2. As a new article of manufacture, a leucogallocyaninsulfonic acid, dyeing chromium mordanted cotton, which has been printed with a discharge, in blue shades, without soiling the whites and being in dry state a violetish-gray to dark-olive-green powder, scarcely soluble in water chiefly in presence of mineral acids, soluble in concentrated sulfuric acid with a pale-violet dichroic color becoming intense blue on addition of an oxidant and soluble in alkalies in presence of air with a violet-red to violet-blue color, becoming gray-blue to bright blue on addition of acetic acid, the said solution in alkalies giving a precipitate on addition of hydrochloric acid.

In witness whereof I have hereunto signed my name, this 6th day of July, 1900, in the presence of two subscribing witnesses.

CHARLES DE LA HARPE.

Witnesses:
 GEO. GIFFORD,
 AMAND RITTER.